US006938182B2

(12) United States Patent
Shaffer et al.

(10) Patent No.: US 6,938,182 B2
(45) Date of Patent: Aug. 30, 2005

(54) SYSTEM AND METHOD FOR PROVIDING RELIABLE TELEPHONY WEB-BASED FEATURES

(75) Inventors: Shmuel Shaffer, Palo Alto, CA (US); Mark Skrzynski, Capitola, CA (US); Tejbans Chadha, Fremont, CA (US); Steven L. Christenson, Campbell, CA (US)

(73) Assignee: Cisco Technology, Inc., San Jose, CA (US)

( * ) Notice: Subject to any disclaimer, the term of this patent is extended or adjusted under 35 U.S.C. 154(b) by 606 days.

(21) Appl. No.: 10/039,159

(22) Filed: Dec. 31, 2001

(65) Prior Publication Data

US 2004/0193951 A1 Sep. 30, 2004

(51) Int. Cl.[7] .................................................. G06F 11/16
(52) U.S. Cl. ................................ 714/9; 714/4; 714/13; 714/43
(58) Field of Search ............................ 714/4, 9, 13, 43

(56) References Cited

U.S. PATENT DOCUMENTS 6,185,598 B1    2/2001  Farber et al. ............... 709/200
6,195,680 B1 *  2/2001  Goldszmidt et al. ........ 709/203
6,760,324 B1 *  7/2004  Scott et al. .................. 370/352
2002/0002602 A1 * 1/2002  Vange et al. ................ 709/219
2002/0026515 A1 * 2/2002  Michielsens et al. ....... 709/227
2003/0035414 A1 * 2/2003  Beyda ......................... 370/352
2003/0103489 A1 * 6/2003  Dezonno et al. ............ 370/351
2004/0199812 A1 * 10/2004 Earl et al. ..................... 714/13

FOREIGN PATENT DOCUMENTS

WO    WO 01/80002 A1    10/2001    .......... H04L/29/06
WO    WO 02/21859 A1     3/2002    .......... H04Q/3/00

OTHER PUBLICATIONS

International Search Report in International Application No. PCT/US 02/39681, dated May 16, 2003, 7 pages.

* cited by examiner

*Primary Examiner*—Robert Beausoliel
*Assistant Examiner*—Joseph D Manoskey
(74) *Attorney, Agent, or Firm*—Baker Botts L.L.P.

(57) ABSTRACT

In accordance with a particular embodiment of the present invention, a method for maintaining telephony Internet services includes providing a first pointer, the first pointer directing a terminal unit to access a first Internet server. A backup pointer is provided, the backup pointer directing the terminal unit to access one or more corresponding backup Internet servers. The first Internet server is accessed based on the first pointer. Upon system failure, the backup Internet server is accessed based on the backup pointer.

36 Claims, 2 Drawing Sheets

SYSTEM AND METHOD FOR PROVIDING RELIABLE TELEPHONY WEB-BASED FEATURES

TECHNICAL FIELD OF THE INVENTION

This invention relates generally to the field of telecommunications, and more specifically to a system and method for providing reliable telephony web-based features.

BACKGROUND OF THE INVENTION

Historically, telecommunications have involved a transmission of voice and fax signals over a network dedicated to telecommunications, such as the Public Switched Telephone Network (PSTN) or a Private Branch Exchange (PBX). Similarly, data communications between computers have also historically been transmitted on a dedicated data network, such as a Local Area Network (LAN) or a Wide Area Network (WAN). The advent of the Internet has increased demand for web-based telephony features. Many existing web-based applications utilize Hyper Text Transfer Protocol (HTTP) communications between browsers and Internet servers. Architecture for Voice, Video and Integrated Data (AVVID), for example, provides the user with a simple browser in a Telecaster phone. This web paradigm is used to provide users with access to numerous services such as conference scheduling, stock quotes, calendaring, and other services via uniform resource locators (URLs). The availability of these services depends upon the availability of the Internet server that renders information to the telephone. Redundant Internet servers that support fail-over and load balancing are typically employed to harden HTTP based applications and features.

SUMMARY OF THE INVENTION

The present invention includes a system and method for providing reliable telephony web-based features that substantially eliminate or reduce disadvantages or problems associated with previously developed systems and methods. In a particular embodiment, the present invention allows for automatically redirecting a device to access a backup web server.

In accordance with a particular embodiment of the present invention, a method for maintaining telephony Internet services includes providing a first pointer, the first pointer directing an Internet browser to access a first Internet server. A backup pointer is provided, the backup pointer directing the Internet browser to access a corresponding backup Internet servers. The first Internet service is accessed based on the first pointer. Upon system failure, the backup Internet server is accessed based on the backup pointer.

In accordance with another embodiment of the present invention, a method for maintaining telephony Internet services includes providing a first call manager and a backup call manager, each call manager maintaining a first and backup Internet server respectively. A first pointer and a backup pointer is provided, the first pointer and backup pointer directing the Internet browser to access the first Internet server and a corresponding backup server, respectively. The first call manager and first Internet server are accessed based on the first pointer. Upon system failure, the backup call manager and Internet server are automatically accessed based on the backup pointer.

In accordance with yet another embodiment of the present invention, a method for maintaining telephony Internet services includes providing a first pointer, the first pointer directing an Internet browser to access a first Internet server. A backup pointer is provided, the backup pointer directing the Internet browser to access a corresponding backup Internet server. Periodic keep-alive messages are sent between the Internet browser and the first Internet server. The first Internet server is accessed, and upon system failure, the backup Internet server is automatically accessed.

In accordance with still another embodiment of the present invention, a method for maintaining telephony Internet services includes providing a plurality of call managers, each including an Internet server for providing services for a number of telephony devices. Resource usage of the Internet servers by the telephony devices is monitored. A load imbalance between the Internet servers is detected and Internet browsers of a subset of telephony devices are directed to shift from an overloaded Internet server to an underloaded Internet server in response to at least the load imbalance.

Technical advantages of the present invention include a system and method for maintaining telephony Internet service. In particular, Internet browsers are provided with a first pointer and one or more backup pointers directing the Internet browser to access a first Internet server and, upon system failure, automatically access a backup Internet server. According to one embodiment of the present invention, the first and backup pointers are uniform resource locators (URLs) directing the Internet browser to access a services menu associated with the first and one or more backup URLs. In another embodiment, call managers are configured to maintain and operate a first and one or more backup Internet servers. Upon failure of a call manager, Internet browsers receiving services from the first Internet server, are automatically redirected to a backup Internet server. Thus, users enjoy uninterrupted voice services and uninterrupted web-based services. Moreover, mission-critical web-based services, such as extension mobility, may be hardened by this fail-over method.

Another technical advantage of the present invention includes a system and method for maintaining telephony Internet service. In particular, a first pointer is provided directing an Internet browser to access a first Internet server, and one or more backup pointers are provided, directing the Internet browser to access one or more corresponding backup Internet servers in the event of system failure. Accordingly, the backup Internet servers may provide primary services to one group of Internet browsers while maintaining a backup status for the Internet browsers receiving primary service from the first Internet server. Thus, dedicated backup Internet servers are unnecessary, saving considerable financial resources.

Additional technical advantages include: supporting fail-over of hypertext transfer protocol (HTTP) services by means of dynamic URLs, thus ensuring the reliability of mission critical web services; eliminating the need for an expensive fail-over server by enhancing the browser with the fail-over mechanism; providing load balancing between servers in a particular cluster; and hardening a wide range of mission critical HTTP services, not limited to voice alone.

It will be understood that various embodiments of the present invention may have some, none, or all of the above and elsewhere described technical advantages. In addition, other technical advantages are readily apparent to one skilled in the art from the following figures, descriptions and claims.

BRIEF DESCRIPTION OF THE DRAWINGS

For a complete understanding of the present invention, and for further features and advantages, reference is now made to the following descriptions, taken in conjunction with the accompanying drawings, in which.

DETAILED DESCRIPTION OF THE DRAWINGS

Figure 1:
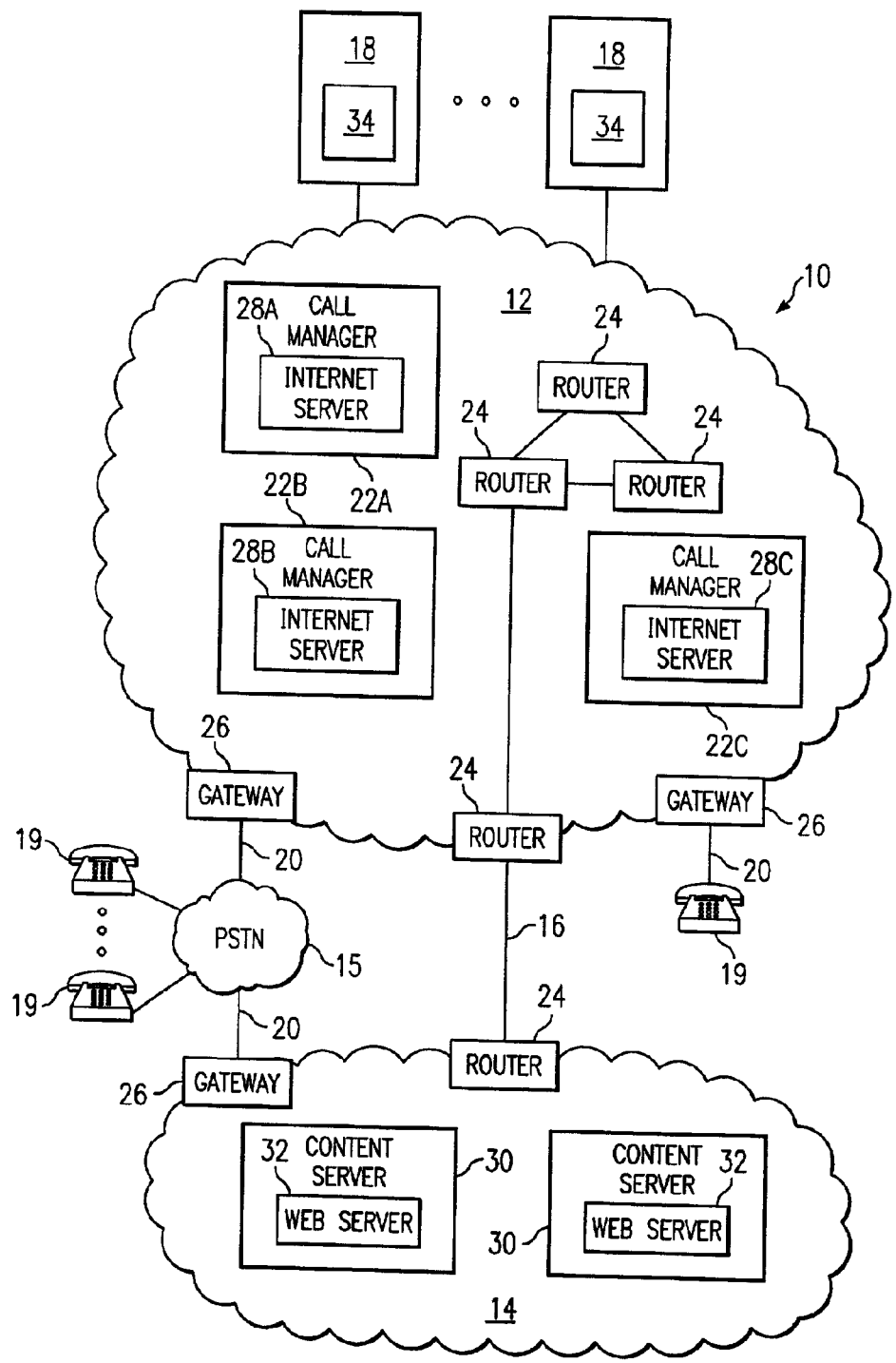
FIG. 1 illustrates a communications network in accordance with a particular embodiment of the present invention.

FIG. 1 illustrates a communications network 10 in accordance with one embodiment of the present invention. Although a specific communications network is illustrated in FIG. 1, the term "communications network" should be interpreted as generically defining any network capable of transmitting telecommunications signals, data, and/or messages.

In the illustrated embodiment, communications network 10 includes a private network 12, a public network 14, and a Public Switched Telephone Network (PSTN) 15. Private network 12, public network 14, and PSTN 15 are interconnected and coupled together via communications links 16 and 20. A plurality of terminal units 18 are coupled to private network 12. A plurality of terminal devices 19 are coupled to PSTN 15 and, via communication link 20, to private network 12. Communications network 10 may include any computer and/or communication network, including, but not limited to, the internet, the intranets, local area networks (LANs), wide area networks (WANs) or metropolitan area networks (MANs). Routers and other elements of communications network 10 may be connected by twisted pair, cable, optical fiber, or other suitable wire-line links and/or radio frequency, microwave, infrared, or other suitable wireless links. Accordingly, terminal units 18 and 19 may include telephones, personal digital assistants (PDAs), computers or any other wire-line or wireless devices capable of voice communication over a distributed network. For simplicity, and in a non-limiting manner, terminal devices 18 are shown as telephones capable of connecting with a public or private network and operable to interpret web-based data or other information.

Similarly, terminal devices 19 are shown as telephones capable of connecting with a public switched telephone network and, via a gateway, with a public or private network and operable to interpret web-based data or other information. Terminal devices 19 may be, for example, a time division multiplex (TDM) telephone. Terminal devices 18 and 19 may be identified individually as specific extensions, such as in a standard telephone communications network, or by dialed number, or by other means to identify each terminal unit 18 as a unique unit.

Private network 12 includes a plurality of call managers 22, a plurality of routers 24, and a plurality of gateways 26. Public network 14 includes a plurality of routers 24, a plurality of gateways 26, and a plurality of content servers 30. Routers 24 are operable to provide connections between terminal units 18 along the private network 12 and connections to public network 14 and PSTN 15. Gateways 26 are operable to establish connections, for example, between terminal units 18 coupled to private network 12, along communications link 20 to PSTN 15, or from terminal devices 18 to terminal devices 19. Routers 24 are in communication with gateway 26 so as to provide communication from private network 12 and public network 14 to PSTN 15.

Call manager 22 includes internet server 28. Call manager 22 is operable to receive call setup requests and other information from terminal units 18 and to establish connections to the various requested destinations, including, but not limited to, internal destinations, as well as destinations outside of private network 12. Internet server 28 is operable to communicate with terminal units 18 and to send and receive requests for information by terminal units 18 and to provide the information to terminal unit 18. Call manager 22 is also operable to transmit pointers to terminal unit 18 indicating the location of certain information related to network internet services. The pointers may be uniform resource locators (URLs) or other suitable identifiers of a server or may point to a data structure from which the URL or server can be determined. Terminal units 18 may also convey information to Internet server 28.

Content server 30 of public network 14 includes web server 32. Content server 30 is in communication with terminal unit 18 and is operable to send and receive content-based information to and from terminal unit 18. Web server 32 is operable to receive requests for information, or content, located on content server 30, and to process and transmit that information to the requesting terminal units 18. Content server 30 and web server 32 are operable to receive pointers directing the servers to provide particular information and to transmit the requested information to the requesting device. As described above, the pointers may be uniform resource locators (URLs).

Terminal unit 18 includes browser 34. Browser 34 is operable to send requests for information to and receive information from call manager 22, internet server 28, content server 30, and web server 32. Browser 34 may be an application operable to communicate with a server over a network and to retrieve and display information or otherwise suitably configured. Terminal units 18 may also convey and obtain information from internet server 28, content server 30, and web server 32.

Call managers 22, routers 24, gateways 26, content servers 30 and other components of the private network 12 or public network 14 may comprise logic encoded in media for carrying out functions of the device. The logic comprises functional instructions for carrying out programmed tasks. The media comprises computer disks or other suitable computer-readable media, application specific integrated circuits (ASIC), field programmable gate arrays (FPGA), digital signal processors (DSP) or other suitable specific or general purpose processors, transmission media or other suitable media in which logic may be encoded and utilized.

Figure 2:
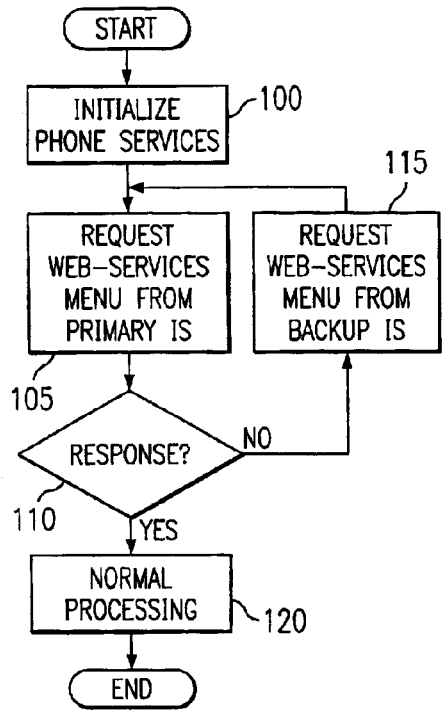
FIG. 2 illustrates a method for providing reliable telephony web-based features in accordance with one embodiment of the present invention.

FIG. 2 illustrates a method for maintaining telephony Internet service, in accordance with one embodiment of the present invention. The process begins at step 100 where basic services are initialized. In this step, a terminal unit 18 begins its initial contact to its primary call manager, for example, call manager 22A of FIG. 1. This initialization is also known as "homing." At step 100, the primary call manager sends to terminal unit 18 all of the configuration information relating to standard services enabled for terminal unit 18. Examples of such services include, local call information, area code information, security information, authorized services, and other suitable information relating to the continuity of voice and data transmission between various endpoints. Along with the configuration information, call manager 22A also sends to terminal unit 18 a pointer for the web-based services menu directing the terminal unit 18 to a list of available web-based services from the call manager 22A or the terminal unit 18 primary internet server 28A. As mentioned above, the pointer may be a URL. Terminal unit 18, via browser 34, uses this URL in conjunction with hypertext transfer protocol (HTTP) to access the web services menu and associated services. Also at step 100, terminal unit 18 receives one or more URLs for one or more backup internet servers, for example, internet server 28B.

At step 105, terminal unit 18 requests the web services menu from the primary internet server via the pointer provided at step 100. In the illustrated embodiment, the pointer refers terminal unit 18 to is internet server 28A. At step 110, a determination is made whether terminal unit 18 has received a response from internet server 28A. If it has not—after a predefined time-out period, for example—the process continues along the No branch of decisional step 110 to step 115. The predefined time-out period may be between five to fifteen seconds or otherwise defined to meet the needs of the particular network. Terminal unit 18 may also receive a response from one or more components of private network 12 indicating that the internet server 28A is non-responsive. This response may include an error message indicating that the requested server is not found or not responding, there is an error in the requested server's response, or other suitable messages. In another embodiment, terminal unit 18 sends a request to both call manager 22A and call manager 22B. Terminal unit 18 will continue the session with whichever call manager responds first.

At step 115, terminal unit 18 requests the web services menu from a backup internet server; in this illustrated embodiment, the backup server is internet server 28B. The process returns to step 105, wherein terminal unit 18 requests the web-services menu from internet server 28B, now the primary internet server. If again there is no response from the internet server, the process continues along the No branch to step 115. If there is a response from internet server 28B, the process continues to step 120, wherein the ordinary web services processing occurs.

In the illustrated embodiment, ordinary web services processing includes the receipt by terminal unit 18 of the web services menu. The web services menu contains pointers for the various services enabled for the terminal unit 18 to locations wherein the services may be accessed. The pointers may direct the terminal unit 18 to locations found on content server 30 or web server 32. The user of terminal unit 18 selects from the various services and, in response to the user selection, terminal unit 18 sends a HTTP request to content server 30 and/or web server 32 to retrieve the requested information or service. Normal web service processing ends when content server 30 or web server 32 sends the requested information and/or services to terminal unit 18.

Figure 3:
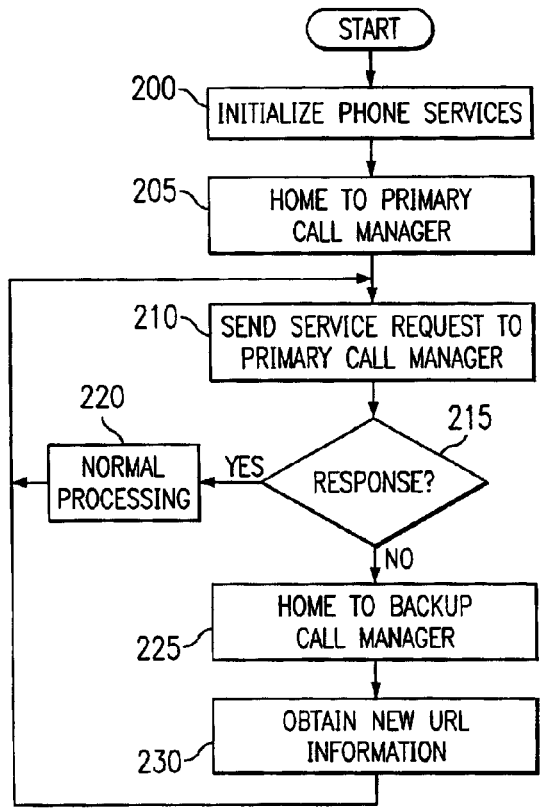
FIG. 3 illustrates a method for providing reliable telephony web-based features in accordance with another embodiment of the present invention.

FIG. 3 illustrates a method for maintaining telephony Internet service, in accordance with another embodiment of the present invention. The process begins at step 200, where basic services are initialized. At this step, terminal device 18 receives configuration information and pointers directing terminal unit 18 to a first call manager, a backup call manager, a first internet server, and a backup internet server. Step 200 is similar to step 100 of FIG. 2. During this initial step 200, terminal unit 18 receives URLs for its primary call manager, in this instance, call manager 22A, and one or more backup call managers. In the illustrated embodiment, these may be call manager 22B and/or call manager 22C. Similarly, terminal unit 18 receives URLs directing it to a primary internet server. In the illustrated embodiment, this is internet server 28A, as well as URLs homing the terminal unit 18 to one or more backup internet servers, in the illustrated embodiment designated as internet servers 28B and/or 28C.

Next, at step 205, terminal unit 18 homes to the primary call manager. In the illustrated embodiment, for example, terminal unit 18 may home to call manager 22A. Similarly, for internet or web-based services, terminal unit 18 receives a URL homing it to internet server 28A as the primary reference point for internet services. As discussed above, this URL will direct terminal unit 18 to a location on internet server 28A that provides a web services menu. Also, as discussed above, the web services menu consists of a plurality of URLs directing terminal unit 18 to various locations throughout the Internet and content servers 30 of public network 14.

Next, at step 210, terminal unit 18 sends a service request to the primary call manager, in this case, call manager 22A. The service request may be one for ordinary phone services, a keep-alive type message, a telephone call origination and connection request, or any other phone, or web based services request.

The process continues at step 215 where terminal unit 18 awaits a response from call manager 22A. If a response is received, the process continues along the Yes branch to step 220, wherein normal processing of the request occurs. Normal processing may be through the ordinary web processing, as described above in connection with step 120 of FIG. 2, or may constitute normal processing of the non-web based services provided to terminal unit 18 through call manager 22A. After step 220, the process ends.

If at decisional step 215 no response is received from call manager 22A by terminal unit 18, the process continues along the No branch to step 225. At step 225, terminal unit 18 will rehome to a backup call manager. As described above, the example backup call manager in this illustrated embodiment is call manager 22B. The terminal unit 18 rehomes to the call manager 22 designated in its initial configuration accomplished at step 200. Also at step 225, terminal unit 18 may rehome, or fail-over, to a backup internet server 28B. If directed by call manager 22B to rehome, or otherwise failing to rehome, the process continues to step 230, wherein terminal unit 18 obtains new URL information directing it to a backup internet server; in the illustrated embodiment designated as internet server 28B. Terminal unit 18 may obtain the new URL information by a push from call manager 22B, a request to call manager 22B, retrieval from a designated list, or other suitable means.

Once terminal unit 18 has obtained the backup URL directing it to obtain the web-based services menu from internet server 28B, the process continues to step 220, wherein normal processing occurs and the process ends. Terminal unit 18 may rehome to internet server 28B automatically, or may be directed to rehome to backup internet server 28B by call manager 22B when terminal unit 18 rehomes to call manager 22B. Not illustrated in FIGS. 2 and 3 is the fact that if at any time during normal processing steps 120 and/or 220 the internet server fails to respond within a designated time-out period, terminal unit 18 rehomes to an alternate internet server.

Figure 4:
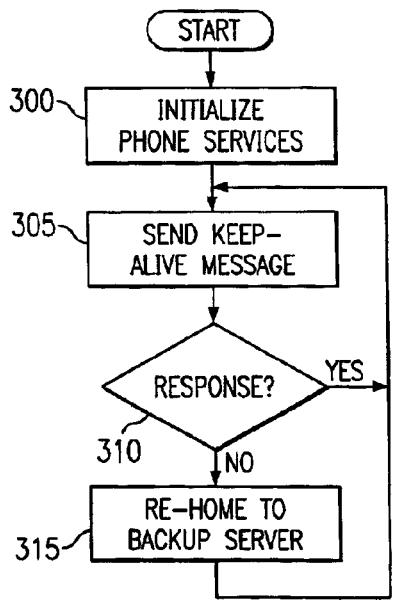
FIG. 4 illustrates a method for providing reliable telephony web-based features in accordance with still another embodiment of the present invention.

FIG. 4 illustrates a method for maintaining telephony internet service in accordance with another embodiment of the present invention. The process begins at step 300 wherein initial phone services are initialized. Similar to step 100 of FIG. 2 and step 200 of FIG. 3, configuration information and primary and backup pointers to the primary and backup call managers 22 and primary internet server 28 are obtained by terminal unit 18. After the initial phone services are initialized, the process continues to step 305 wherein terminal unit 18 sends a keep-alive message. The message may be by HTTP protocol, or otherwise suitably transmitted.

The message may be directed to either the primary call manager 22 (in the illustrated embodiment, for example, it may be call manager 22A), or the keep-alive message may be directed to the primary internet server 28, for example, internet server 28A in the illustrated embodiment. The keep-alive message may be of a fixed-or variable-length packet or otherwise suitably configured to request the status of either call manger 22 or an internet server 28. After the keep-alive message is transmitted, the process continues to step 310.

At step 310, a determination is made whether a response to the keep-alive message is received. If a response has been received, the process returns to step 305. In an alternative embodiment, terminal unit 18 may send periodic keep-alive messages at a predetermined rate, for example, one keep-alive message every 50 seconds.

If at decisional step 310 no response is received by terminal unit 18, the process continues along the No branch to step 315. At step 315, terminal unit 18 rehomes to a backup server. In the instance where the terminal unit 18 has sent a keep-alive message to call manager 22A, terminal unit 18 may rehome to the backup call manager, for example, call manager 22B, as well as the backup internet server, for example, internet server 28B. In the instance where terminal unit 18 sends the keep-alive message to internet server 28A, it may maintain primary services from call manager 22A and rehome for web services and the web services menu to a backup internet server, for example, internet server 28B, as provided in the keep-alive messages. After the terminal unit 18 has rehomed to a backup server, the process returns to step 305.

Figure 5:
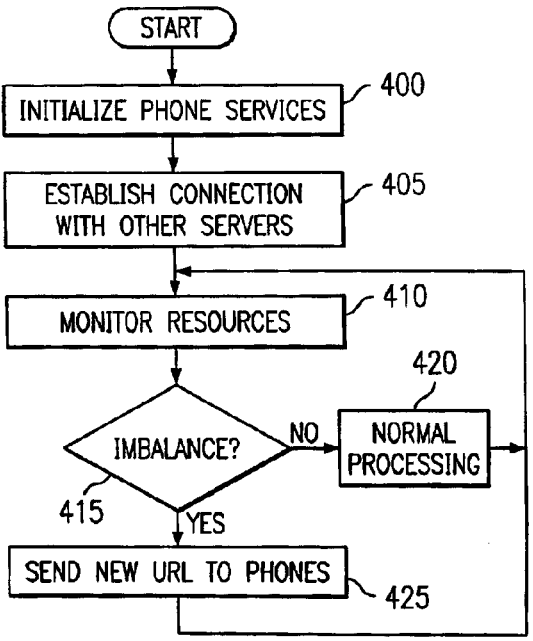
FIG. 5 illustrates a method for providing reliable telephony web-based features in accordance with yet another embodiment of the present invention.

FIG. 5 illustrates a method for maintaining telephony internet service in accordance with another embodiment of the present invention. The process begins at step 400 wherein a call manager 22 initializes phone services for a terminal unit 18 or group of terminal units 18. As described above in connection with step 100 of FIG. 2, step 200 of FIG. 3, and step 300 of FIG. 4, similar configuration information is passed to terminal unit 18, including primary and backup pointers.

The process continues at step 405, wherein call manager 22 establishes connections with other servers and call managers throughout private network 12. The connections are operable to receive information regarding allocation of the network resources among the various call managers 22 and internet servers 28, as well as load sharing information for each of the terminal units 18 with respect to their primary call mangers 22. As used herein, "each" means all of a particular subset. Once the connection with the other servers has been established, the process continues to step 410.

At step 410, call manager 22 monitors the resources being used for web services along private network 12. For example, call manager 22A may monitor the network resources and usage of the other call managers 22B and 22C, as well as its own resources and the resources of the various associated internet servers 28. After monitoring the resources at step 410, the process continues to decisional step 415.

At decisional step 415, call manager 22A makes a determination whether there is an imbalance in the allocation of resources among network 12. An imbalance in the distribution of resources may be by a depletion of available resources for the terminal units 18 serviced by call manager 22A or serviced by internet server 28A, or a surplus of resources available for internet server 28A and a depletion of resources among the other internet servers 28B and 28C. In one embodiment, call manager 22A makes a determination whether internet server 28A is running out of available resources. If at decisional step 415, call manager 22A determines that there is not an imbalance, the process continues along the No branch to step 420. At step 420, normal processing of phone and web services occurs. Normal processing has been described in more detail above in connection with step 120 of FIG. 2 and step 220 of FIG. 3.

If at decisional step 415, call manager 22A determines that there is an imbalance, the process continues along the Yes branch to step 425. At step 425, call manager 22A provides terminal unit 18 a different pointer directing terminal unit 18 to an underloaded internet server. In the illustrated embodiment, call manager 22A may direct a particular terminal unit 18 to switch from an overloaded internet server 28A to an underloaded internet server 28B. Call manager 22A makes this change by sending terminal unit 18 one or more new URL/pointers directing terminal unit 18 to retrieve its web services menu, for example, from internet server 28B.

The process continues by returning to step 410, wherein call manager 22A continues to monitor the resources of the communications network 12. The process may continue as further imbalances are discovered by proceeding to decisional step 415, discovering an imbalance, proceeding along the Yes branch to step 425, wherein call manager 22A redirects the terminal units 18 for which it provides services to rehome back to the primary internet server 28A. If no imbalance is detected, the process continues along the No branch back to step 420, wherein normal processing resumes and the process ends.

Although the steps of the various methods have been described in a particular order, it will be understood that certain steps may be omitted, or additional steps added, as required by the network configuration.

Although the present invention has been described with several embodiments, a myriad of changes, variations, alterations, transformations, and modifications may be suggested to one skilled in the art, and it is intended that the present invention encompass such changes, variations, alterations, transformations, and modifications as fall within the spirit and scope of the appended claims.

What is claimed is:

1. A method for maintaining Voice Over Internet Protocol (VoIP) custom services, comprising:

homing a terminal unit to a call manager;

providing telephone services to the terminal unit through the call manager;

providing the terminal unit with a first pointer, the first pointer directing the terminal unit to access a menu of web-based services available to the terminal unit on a first Internet server associated with the call manager;

the menu of web-based services including links to content servers operable to provide web-based services to the terminal unit;

providing the terminal unit with a backup pointer, the backup pointer directing the terminal unit to access the menu of web-based services available to the terminal unit on a corresponding backup Internet server;

accessing the first Internet server through the first pointer; and upon system failure, automatically accessing the backup Internet server through the backup pointer.

2. The method of claim 1, wherein the pointers comprise uniform resource locators (URLs).

3. The method of claim 1, wherein the system failure comprises a first Internet server time-out error.

4. The method of claim 1, wherein the call manager is configured to operate the first Internet server; and the system failure comprises a failure of the call manager.

5. The method of claim 4, further comprising pushing the backup pointer to the terminal unit upon the system failure.

6. The method of claim 4, wherein a backup call manager is configured to operate a corresponding backup Internet server, further comprising, upon system failure, automatically rehoming to the backup call manager.

7. The method of claim 6, further comprising providing a plurality of backup pointers, each backup pointer directing the terminal unit to access a corresponding backup Internet server.

8. The method of claim 7, further comprising automatically accessing a backup call manager upon the system failure.

9. The method of claim 4, further comprising sending periodic keep-alive messages between the terminal unit and the first call manager.

10. The method of claim 9, wherein the system failure comprises a keep-alive failure.

11. The method of claim 9, wherein the keep-alive messages include the backup pointer.

12. The method of claim 1, wherein the web-based services comprise at least one of the following: conference call scheduling and hosting, quoting stock prices, creating and updating calendar entries, and enabling extension mobility.

13. A system for maintaining VoIP custom services, comprising:

a means for homing a terminal unit to a call manager;

a means for providing telephone services to the terminal unit through the call manager;

a means for providing the terminal unit with a first pointer, the first pointer directing the terminal unit to access a menu of web-based services available to the terminal unit on a first Internet server associated with the call manager;

the menu of web-based services including links to content servers operable to provide web-based services to the terminal unit;

a means for providing the terminal unit with a backup pointer, the backup pointer directing the terminal unit to access the menu of web-based services available to the terminal unit on a corresponding backup Internet server;

a means for accessing the first Internet server through the first pointer; and upon system failure, a means for automatically accessing the backup Internet server through the backup pointer.

14. The system of claim 13, wherein the pointers comprise uniform resource locators (URLs).

15. The system of claim 13, wherein the system failure comprises a first Internet server time-out error.

16. The system of claim 13, wherein the call manager is configured to operate the first Internet server; and the system failure comprises a failure of the call manager.

17. The system of claim 16, further comprising a means for pushing the backup pointer to the terminal unit upon the system failure.

18. The system of claim 16, wherein a backup call manager is configured to operate a corresponding backup Internet server, further comprising, a means for automatically rehoming to the backup call manager upon system failure.

19. The system of claim 18, further comprising a means for providing a plurality of backup pointers, each directing the terminal unit to access a corresponding backup Internet server.

20. The system of claim 19, further comprising a means for automatically accessing a backup call manager upon the system failure.

21. The system of claim 16, further comprising a means for sending periodic keep-alive messages between the terminal unit and the first call manager.

22. The system of claim 21, wherein the system failure comprises a keep-alive failure.

23. The system of claim 21, wherein the keep-alive messages include a backup pointer.

24. A system, comprising:

logic embedded on a computer-readable medium; and the logic operable to home a terminal unit to a call manager; provide telephone services to the terminal unit through the call manager; provide the terminal unit with a first pointer, the first pointer directing a terminal unit to access a menu of web-based services available to the terminal unit on a first Internet server associated with the call manager; the menu of web-based services including links to content servers operable to provide web-based services to the terminal unit; provide the terminal unit with a backup pointer, the backup pointer directing the terminal unit to access the menu of web-based services available to the terminal unit on a corresponding backup Internet server; access the first Internet server through the first pointer; and upon system failure, automatically access the backup Internet server through the backup pointer.

25. The system of claim 24, wherein the pointers comprise uniform resource locators (URLs).

26. The system of claim 24, wherein the system failure comprises a first Internet server time-out error.

27. The system of claim 24, wherein a the call manager is configured to operate the first Internet server; and the system failure comprises a failure of the call manager.

28. The system of claim 27, the logic further operable to push the backup pointer to the terminal unit upon the system failure.

29. The system of claim 27, wherein a backup call manager is configured to operate a corresponding backup Internet server, the logic further operable to automatically rehome to the backup call manager upon system failure.

30. The system of claim 29, the logic further operable to provide a plurality of backup pointers, each directing the terminal unit to access a corresponding backup Internet server.

31. The system of claim 30, the logic further operable to automatically access a backup call manager upon the system failure.

32. The system of claim 27, the logic further operable to send periodic keep-alive messages between the terminal unit and the first call manager.

33. The system of claim 32, wherein the system failure comprises a keep-alive failure.

34. The system of claim 32, wherein the keep-alive messages include the backup pointer.

35. A method for maintaining VoIP custom services, comprising:
- providing a plurality of call managers, each including an Internet server for providing a menu of web-based services for a number of telephony devices;
- providing telephone services to the telephony devices through the plurality of call managers;
- the menu of web-based services including links to content servers operable to provide web-based services to the telephony devices;
- monitoring resource usage by the telephony devices of the Internet servers;
- detecting a load imbalance between the Internet servers; and
- directing a terminal unit of a subset of telephony devices to shift from an overloaded Internet server to an underloaded Internet server in response to at least the load imbalance.

36. The method of claim 35, wherein the terminal units are directed by changing a sequence of pointers in a list of pointers.

* * * * *

UNITED STATES PATENT AND TRADEMARK OFFICE
CERTIFICATE OF CORRECTION

PATENT NO. : 6,938,182 B2  Page 1 of 1
APPLICATION NO. : 10/039159
DATED : August 30, 2005
INVENTOR(S) : Shaffer et al.

It is certified that error appears in the above-identified patent and that said Letters Patent is hereby corrected as shown below:

Column 10, Line 44, Claim 27, after "wherein", delete "a".

Signed and Sealed this

Twenty-first Day of November, 2006

JON W. DUDAS
*Director of the United States Patent and Trademark Office*